(12) United States Patent
Oh et al.

(10) Patent No.: US 8,755,168 B2
(45) Date of Patent: Jun. 17, 2014

(54) PACKAGE TYPE MULTI LAYER THIN FILM CAPACITOR FOR HIGH CAPACITANCE

(75) Inventors: Young Joo Oh, Seoul (KR); Jung Rag Yoon, Yongin-si (KR); Kyung Min Lee, Paju-si (KR); Young Min Yoo, Suwon-si (KR)

(73) Assignee: Samhwa Capacitor Co., Ltd. (KR)

( * ) Notice: Subject to any disclaimer, the term of this patent is extended or adjusted under 35 U.S.C. 154(b) by 371 days.

(21) Appl. No.: 13/397,206

(22) Filed: Feb. 15, 2012

(65) Prior Publication Data
US 2013/0058002 A1    Mar. 7, 2013

(30) Foreign Application Priority Data

Sep. 6, 2011  (KR) .................. 10-2011-0090153

(51) Int. Cl.
  *H01G 9/00*   (2006.01)
  *H01G 4/224*  (2006.01)
  *H01G 2/10*   (2006.01)
  *H01G 4/30*   (2006.01)
  *H01G 4/232*  (2006.01)
  *H01G 2/06*   (2006.01)

(52) U.S. Cl.
  CPC ................. *H01G 4/30* (2013.01); *H01G 4/224* (2013.01); *H01G 2/103* (2013.01); *H01G 4/232* (2013.01); *H01G 2/06* (2013.01)
  USPC ............................. 361/329; 361/541; 361/522

(58) Field of Classification Search
  USPC .................................. 361/328–329, 522, 541
  See application file for complete search history.

(56) References Cited

U.S. PATENT DOCUMENTS

| 1,768,440 | A  | * | 6/1930  | Dubilier ...................... 361/329 |
| 5,367,437 | A  | * | 11/1994 | Anderson ..................... 361/807 |
| 6,239,965 | B1 | * | 5/2001  | Shiraishi et al. .............. 361/511 |
| 6,331,929 | B1 |   | 12/2001 | Masuda |
| 7,352,563 | B2 | * | 4/2008  | Pelcak et al. .................. 361/541 |

FOREIGN PATENT DOCUMENTS

| JP | 64073610 A | * | 3/1989 |
| JP | 01091411 A | * | 4/1989 |
| JP | 03245515 A | * | 11/1991 |
| JP | 05166687 A | * | 7/1993 |

* cited by examiner

*Primary Examiner* — Eric Thomas
(74) *Attorney, Agent, or Firm* — Cantor Colburn LLP

(57) ABSTRACT

Provided is a package type multilayer thin film capacitor for a high capacitance, including: a capacitance block 110; a pair of clamp members 120 and 130 being installed on one side and another side of the capacitance block 110, respectively; a pair of lead members 140 and 150 being installed on the clam members 120 and 130, respectively; and a molding member 160 filling in the capacitance block 110 to partially expose each of the pair of lead members 140 and 150. The capacitance block may be configured by adhering at least two of a ceramic sintered member 111, a metal capacitance member 112, and a thin film capacitance member 113 using an insulating adhesive member and thereby disposing the at least two members in a multilayered form. Accordingly, capacitance may increase and mechanical strength may be enhanced.

16 Claims, 6 Drawing Sheets

PACKAGE TYPE MULTI LAYER THIN FILM CAPACITOR FOR HIGH CAPACITANCE

CROSS-REFERENCE TO RELATED APPLICATION

This application claims the benefit of Korean Patent Application No. 10-2011-0090153, filed on Sep. 6, 2011, in the Korean Intellectual Property Office, the disclosure of which is incorporated herein by reference.

BACKGROUND OF THE INVENTION

1. Field of the Invention

The present invention relates to a package type multilayer thin film capacitor for a high capacitance, and more particularly, to a package type multilayer thin film capacitor for a high capacitance that may increase capacitance and may also enhance mechanical strength.

2. Description of the Related Art

A multilayer ceramic capacitor (MLCC) is being widely used as an electronic part having thinness, high power, and high reliability. The MLCC is formed to alternately dispose a dielectric layer and an internal electrode layer. The MLCC is being expansively employed in an industrial field or an electric automobile field and thus, there is an increasing desire for high capacitance of the MLCC.

Hereinafter, a configuration of the MLCC will be described with reference to FIG. 1. As shown in FIG. 1, a conventional MLCC 1 includes a ceramic sintered body 2, a protecting layer 3, and an external electrode 4.

The ceramic sintered body 2 may be formed by disposing and sintering a plurality of green sheets 3. Each of the plurality of green sheets 3 may include a dielectric thin film sheet 3a and an internal electrode layer 3b. The dielectric thin film sheet 3a may be formed to have a thickness of a few to hundreds of μm by applying a high dispersed slurry manufacturing method and a die-coater or a lip coater. The internal electrode layer 3b may be formed by spraying, on the dielectric thin film sheet 3a, at least one metal material of silver (Ag), platinum (Pt), palladium (Pd), Ag—Pd Alloy, and cupper (Cu).

The protecting layer 4 may be formed by forming, as a ceramic sintered body, an external circumferential surface excluding both side surfaces of the ceramic sintered body 2, or by employing one of insulating compound or insulating film that is insulating polymer. When the protecting layer 4 is formed, the MLCC 1 is manufactured by forming an external electrode 5 to electrically connect the internal electrode layer 2b to both side surfaces of the ceramic sintered body 2.

The conventional MLCC manufactured as above is manufactured as thin films in order to increase capacitance by increasing the number of layers. However, when the MLCC is manufactured as thin films, the surface area may be significantly wide compared to the overall thickness. Accordingly, a mechanical strength may be degraded. In addition, due to internally occurring heat or heat transferred from an outside, a heat-resistant property may be easily degraded.

SUMMARY OF THE INVENTION

The present invention provides a package type multilayer thin film capacitor for high capacitance that may increase capacitance and may also enhance a mechanical strength by disposing different types of capacitance members.

The present invention also provides a package type multilayer thin film capacitor for high capacitance that may enhance a mechanical strength and may also enhance a heat-resistant property by supporting different types of capacitance members using a clamp member.

The present invention also provides a package type multilayer thin film capacitor for high capacitance that may increase a mechanical strength and a heat-resistant property by disposing different types of capacitance members, and by supporting the different types of capacitance members using a clamp member, and thereby may enhance reliability and lifespan.

According to an aspect of the present invention, there is provided a package type multilayer thin film capacitor for a high capacitance, including: a capacitance block; a pair of clamp members being installed on one side and another side of the capacitance block, respectively; a pair of lead members being installed on the clam members, respectively; and a molding member filling in the capacitance block to partially expose each of the pair of lead members. The capacitance block may be configured by adhering at least two of a ceramic sintered member, a metal capacitance member, and a thin film capacitance member using an insulating adhesive member and thereby disposing the at least two members in a multilayered form.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE INVENTION

Figure 1:
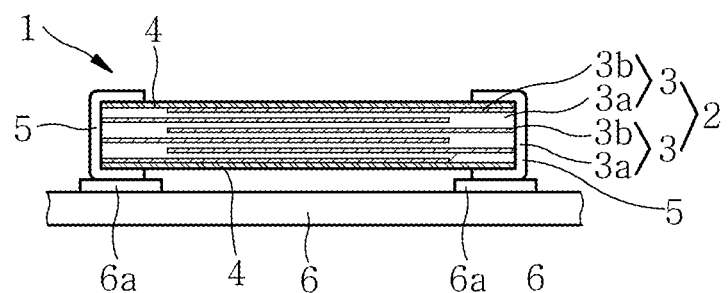
FIG. 1 is a cross-sectional view of a conventional a multilayer thin film capacitor.
Figure 2:
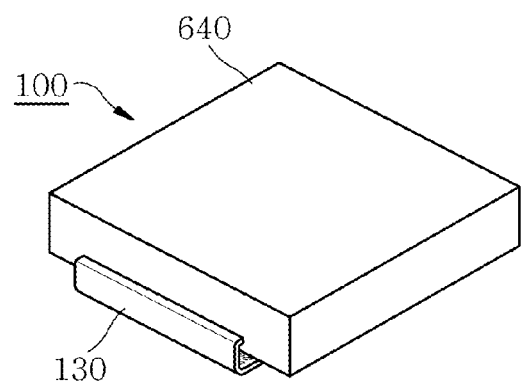
FIG. 2 is a perspective view of a package type multilayer thin film capacitor for high capacitance of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a package type multilayer thin film capacitor for high capacitance according to exemplary embodiments of the present invention will be described with reference to the accompanying drawings.

As shown in FIGS. 2 through 5, a package type multilayer thin film capacitor 100 for high capacitance of the present invention may include a capacitance block 110, a singe pair of clamp members 120 and 130, a single pair of lead members 140 and 150, and a molding member 160.

The capacitance block 110 may be formed by sequentially disposing a ceramic sintered member 111, a metal capacitance member 112, and a thin film capacitance member 113. The single pair of clamp members 120 and 130 may be provided on one side and another side of the capacitance block 110, respectively. The single pair of lead members 140 and 150 may be provided on the clamp members 120 and 130, respectively. The molding member 160 may be formed by filling in the capacitance block 110 in order to partially expose each of the single pair of the lead members 140 and 150.

A configuration of the package type multilayer thin film capacitor 100 for high capacitance of the present invention constructed as above will be further described as follows.

As shown in FIGS. 6 through 9, the capacitance block 110 may include different types of capacitance members 111, 112, and 113, an insulating adhesive member 114, and an insulating smoothness adjusting member 115. The different types of capacitance members 111, 112, and 113 may include the ceramic sintered member 111, the metal capacitance member 112, and the thin film capacitance member 113. The capacitance block 110 may be formed by adhering, using the insulating adhesive member 114, and disposing at least two of the ceramic sintered member 111, the metal capacitance member 112, and the thin film capacitance member 113, which are the different types of capacitance members 111, 112, and 113.

Among the different types of capacitance members 111, 112, and 113, the ceramic sintered member 111 may work as a support body for supporting the metal capacitance member 112 or the thin film capacitance member 13 and thereby increase a mechanical characteristic of the capacitance block 110. The metal capacitance member 112 may be disposed on one of a top or a bottom of the ceramic sintered member 111 and be supported by the ceramic sintered member 111. The thin film capacitance member 113 may be disposed on one of the top or the bottom of the ceramic sintered member 111 and be supported by the ceramic sintered member 111.

The insulating adhesive member 114 may be formed between the ceramic sintered member 111 and the metal capacitance member 112, and between the ceramic sintered member 111 and the thin film capacitance member 113 to thereby enable the ceramic sintered member 111 to be electrically insulated from the metal capacitance member 112 or the thin film capacitance member 113 and thereby be disposed thereon. The insulating smoothness adjusting member 115 may be formed on a top or a bottom of an exposing portion 22 of the metal capacitance member 112 or an exposing portion 32 of the thin film capacitance member 113 on the ceramic sintered member 111.

The insulating smoothness adjusting member 115 may be formed of an insulating resin material, and may be formed so that the ceramic sintered member 111, the metal capacitance member 112, and the thin film capacitance member 113 may be sequentially and smoothly disposed. The insulating smoothness adjusting member 115 may be formed on the top or the bottom of the exposing portion 22 or the exposing portion 32 in order to prevent bending or disconnection due to a thickness difference between an active portion 21 and the exposing portion of the metal capacitance member 112 or a thickness difference between an active portion 31 and the exposing portion 32 of the thin film capacitance member 113 when manufacturing the capacitance block 110.

A multi-layering embodiment of the capacitance block 110 will be described with reference to FIGS. 6 through 9.

Figure 6:
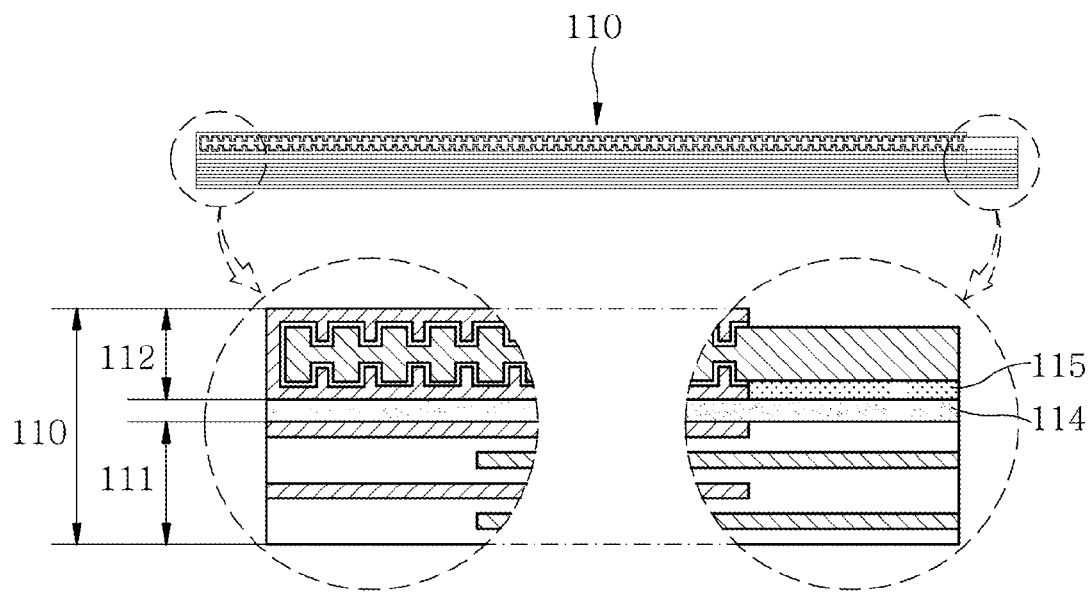
FIG. 6 is a side cross-sectional view of a capacitance block of FIG. 5 according to a first embodiment.
Figure 7:
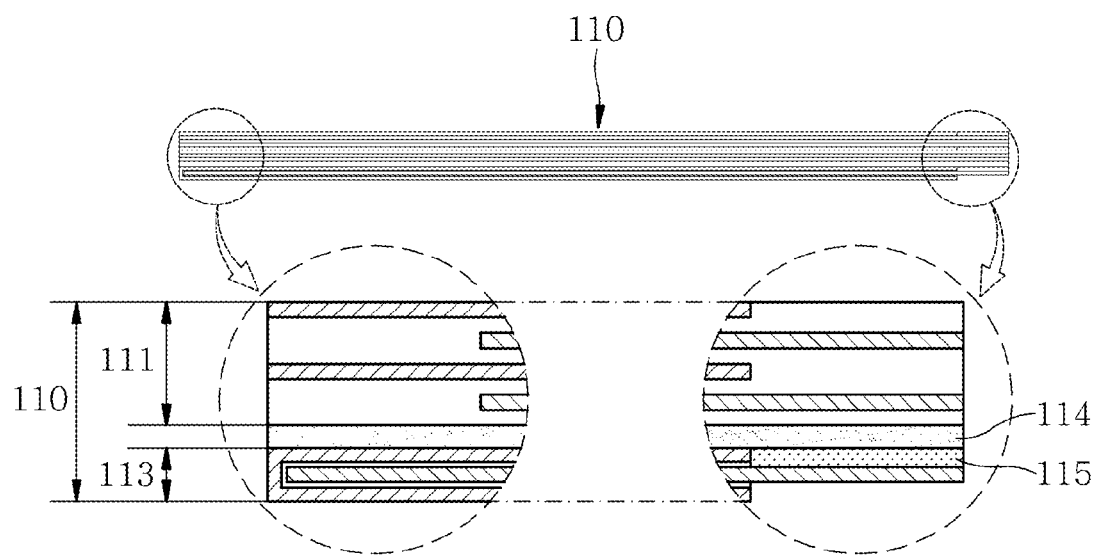
FIG. 7 is a side cross-sectional view of the capacitance block of FIG. 5 according to a second embodiment.
Figure 8:
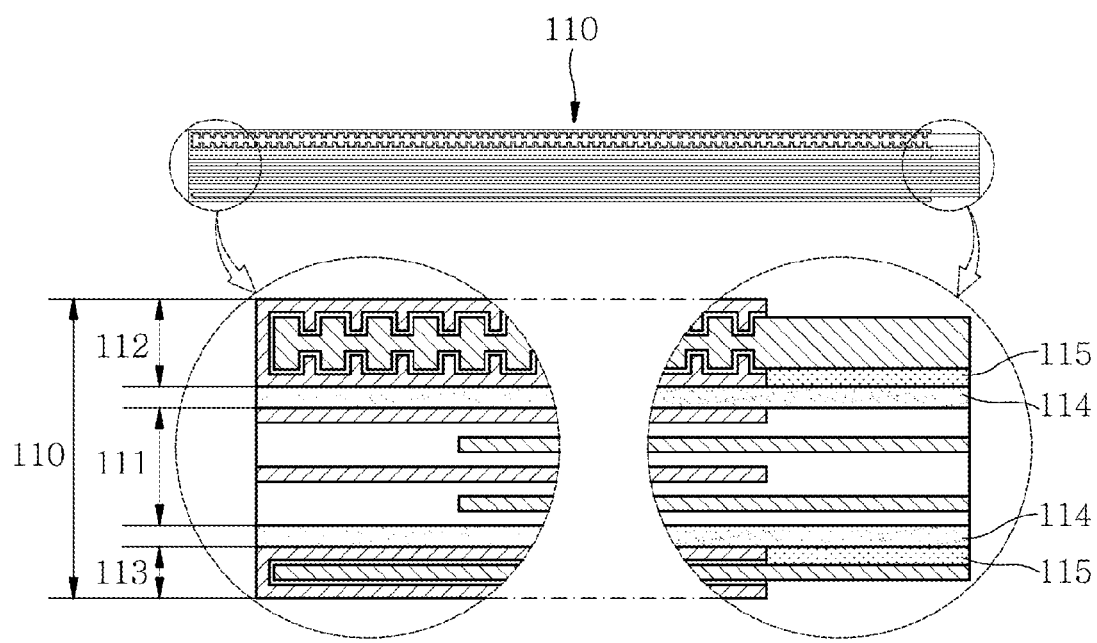
FIG. 8 is a side cross-sectional view of the capacitance block of FIG. 5 according to a third embodiment.

FIG. 6 shows a configuration in which, among the different types of capacitance members 111, 112, and 113, two members are multilayered by disposing the metal capacitance member 112 on the top of the ceramic sintered member 111. FIG. 7 shows a configuration in which the thin film capacitance member 113 is disposed on the bottom of the ceramic sintered member 111. FIG. 8 shows a configuration in which all of the different types of capacitance members 111, 112, and 113 are multi-layered by sequentially disposing the ceramic sintered member 111, the metal capacitance member 112, and the thin film capacitance member 113. When providing the respective corresponding members, the insulating smoothness adjusting member 115 may be interposed therebetween to thereby electrically insulate therebetween.

Figure 9:
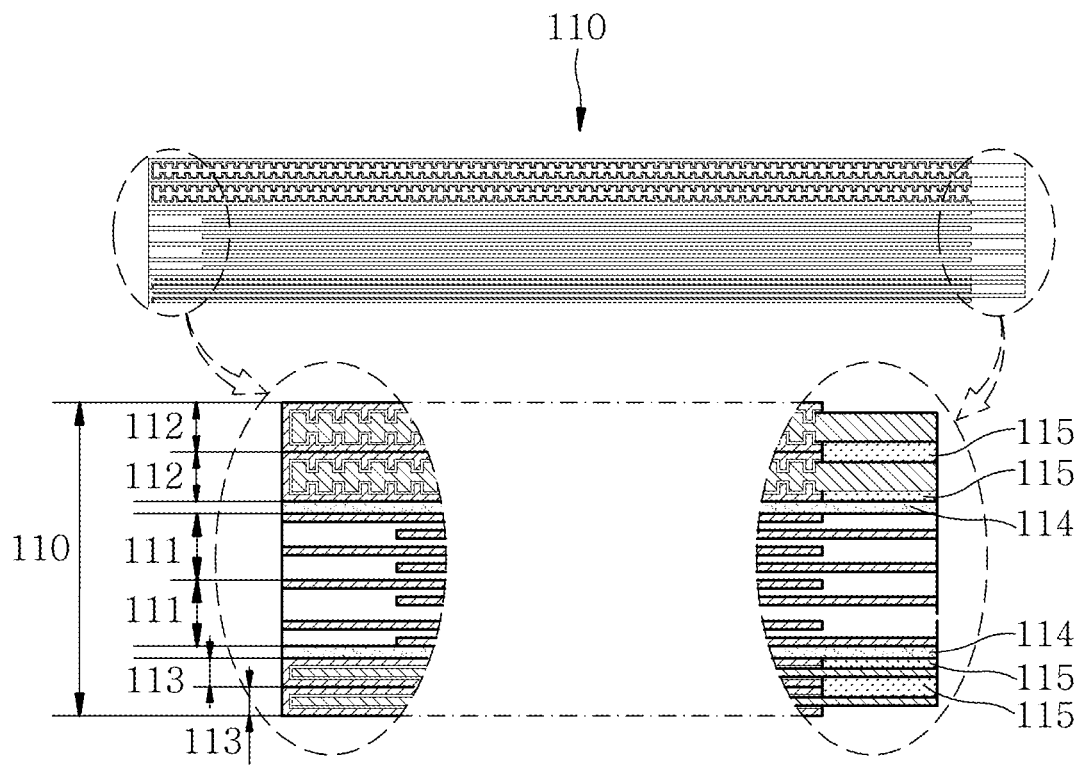
FIG. 9 is a side cross-sectional view of the capacitance block of FIG. 5 according to a fourth embodiment.

FIG. 9 illustrates an embodiment in which the different types of plurality of capacitance members 111, 112, and 113 are provided to increase capacitance. When each of the ceramic sintered member 111, the metal capacitance member 112, and the thin film capacitance member 113 is provided to be plural, the capacitance block 110 of FIG. 9 is configured by sequentially disposing the same types of capacitance members 111, 112, and 113 using conductive epoxy or a compression method. For example, the capacitance block 110 may be provided by initially sequentially disposing the plurality of ceramic sintered members 111, the plurality of metal capacitance members 112, and the plurality of thin film capacitance members 113 and then interposing the insulating smoothness adjusting member 115 with respect to the multi-layered ceramic sintered member 111, metal capacitance member 112, and thin film capacitance member 113.

In the capacitance block 110 configured according to the above various embodiments, the different types of capacitance members 111, 112, and 113 are provided in a multilayered structure to be in parallel with each other by interposing the insulating smoothness adjusting member 115 on the top or bottom of the ceramic sintered member 111, and by applying conductive epoxy between the same types of capacitance members 111, 112, and 113. Accordingly, high capacitance may be achieved by increasing the overall capacitance.

In a configuration of the capacitance block 110, a configuration of the ceramic sintered member 111, the metal capacitance member 112, and the thin film capacitance member 113 will be described with reference to FIGS. 10 through 12.

Figure 10:
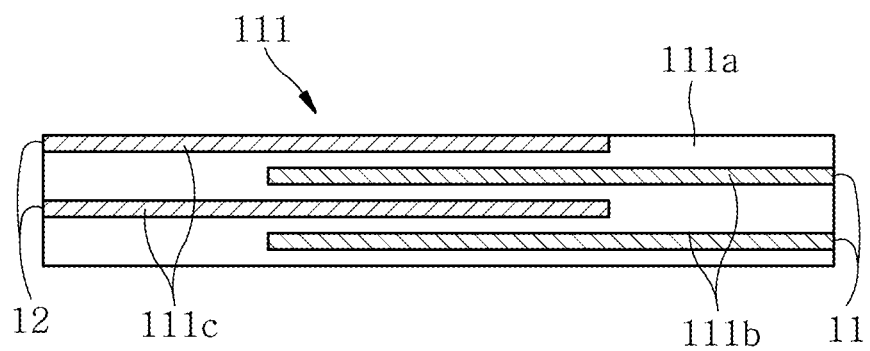
FIG. 10 is an enlarged side cross-sectional view of a ceramic sintered member of FIG. 9.

As shown in FIG. 10, the ceramic sintered member 111 may include a ceramic block 111a, a plurality of first internal electrode layers 111b, and a plurality of second internal electrode layers 111c.

The ceramic block 111a may function as a dielectric body and a support by body by supporting each of the metal capacitance member 112 and the thin film capacitance member 113.

Figure 5:
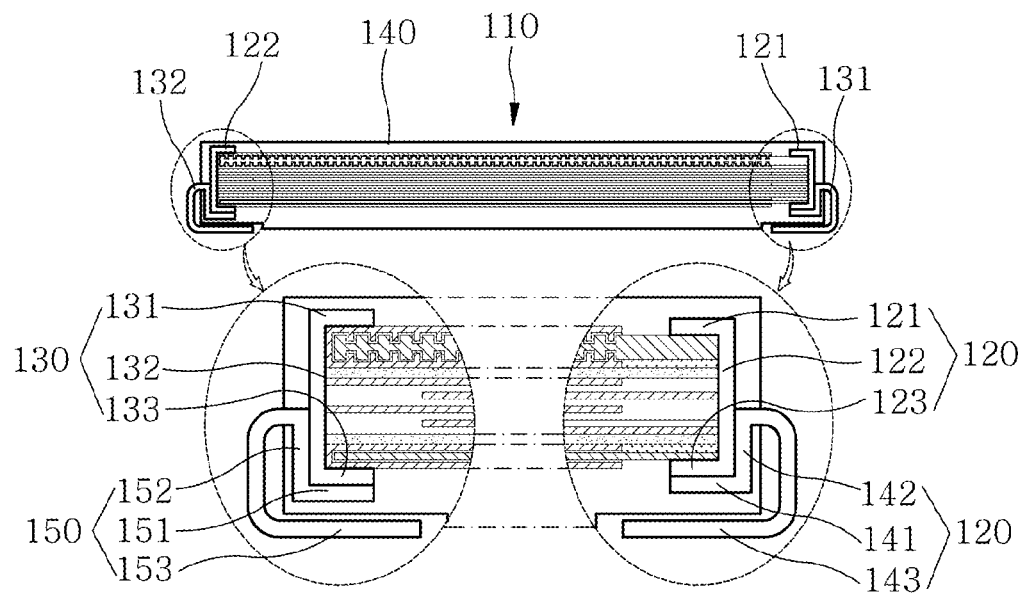
FIG. 5 is a side cross-sectional view of the package type multilayer thin film capacitor of FIG. 3.

Each of the plurality of first internal electrode layers 111b may select and use one of silver (Ag), platinum (Pt), palladium (Pd), Ag—Pd alloy, and cupper (Cu), and may be formed within the ceramic block 111a to be connected to one of the single pair of clamp members 120 and 130. For example, as shown in FIGS. 5 and 10, an end 11 of one side of each of the plurality of first internal electrode layers 111b may be connected to another one of the single pair of clamp members 120 and 130, that is, the first clamp member 120.

Each of the plurality of second internal electrode layers 111c may select and use one of silver (Ag), platinum (Pt), palladium (Pd), Ag—Pd alloy, and cupper (Cu), and may be formed within the ceramic block 111a to be positioned between the plurality of first internal electrode layers 111b and to be connected to the other one of the single pair of clamp members 120 and 130. That is, as shown in FIGS. 5 and 10, an end 12 of another side of each of the plurality of second internal electrode layers 111c may be connected to the other one of the single pair of clamp members 120 and 130, that is, the second clamp member 130.

Figure 11:
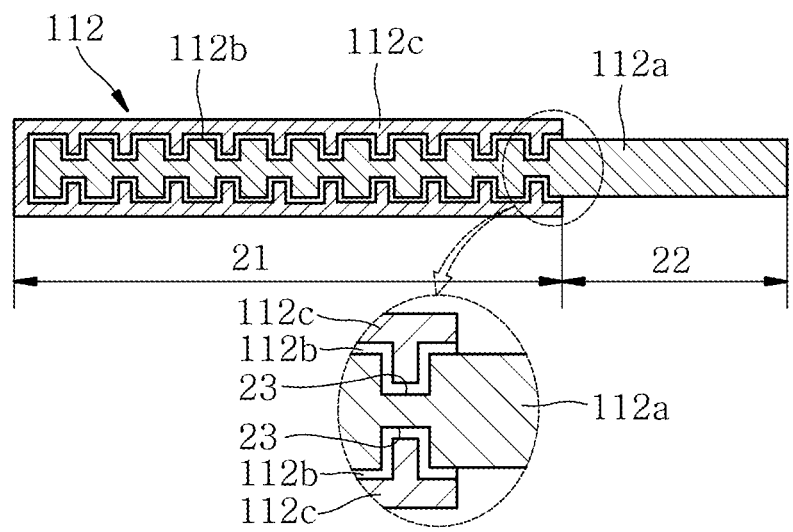
FIG. 11 is an enlarged side cross-sectional view of a metal capacitance member of FIG. 9.

As shown in FIG. 11, the metal capacitance member 112 may include a metal foil 112a, a metal oxide film 112b, and a filling metal layer 112c.

The metal foil 112a may include an active portion 21 formed with a plurality of grooves on both surfaces thereof and an exposing portion 22 integrally formed with an end of the active portion 21 thereon. The active portion 21 may be formed so that the plurality of grooves 23 may be arranged on both surfaces of the active portion 21 using an etching method. Next, the metal oxide film 112b and the filling metal layer 112c may be sequentially formed. On the other hand, instead of forming the metal oxide film 112b, the exposing portion 22 may be formed to be externally exposed in order to enhance an equivalent series resistance characteristic when adhering with the first clamp 120. The metal oxide film 112b may be formed on the active portion 21, and the filling metal layer 112c may cover the active portion 21 and be formed on the top of the metal oxide film 112b to fill in the plurality of grooves 23.

The metal foil 112a of the metal capacitance member 112 may select and use one of aluminum (Al), niobium (Nb), tantalum (Ta), zirconium (Zr), and titanium (Ti). The metal oxide film 112a may select and use one of alumina ($Al_2O_3$), niobium oxide ($Nb_2O_5$), tantalum oxide ($Ta_2O_5$), zirconium oxide ($ZrO_2$), and titanium oxide ($TiO_2$). The filling metal layer 112c may select and use one of aluminum (Al), cupper (Cu), and nickel (Ni).

The metal capacitance member 112 may enhance capacitance or a heat-resistant property due to an increase in a surface area by forming the plurality of grooves 23 on both surfaces of the active portion 21, however, may be fragile. To enhance the above fragility, the metal capacitance member 112 may be disposed on the top or bottom of the ceramic sintered member 111 to be supported by the ceramic sintered member 111.

Figure 12:
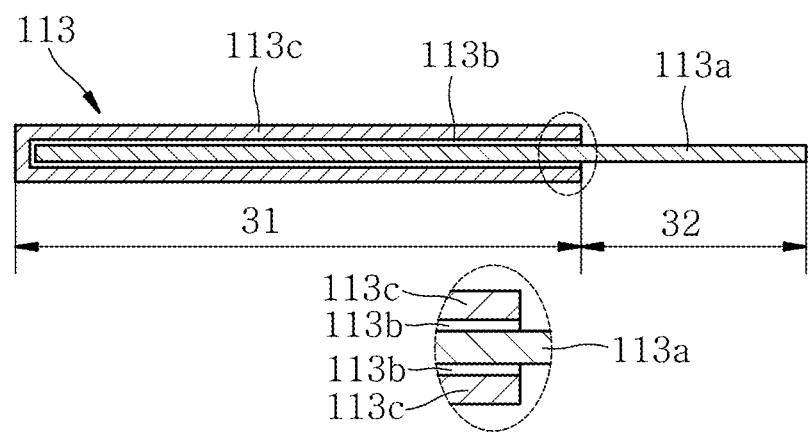
FIG. 12 is an enlarged side cross-sectional view of a thin film capacitance member of FIG. 9.

As shown in FIG. 12, the thin film capacitance member 113 may include a metal foil 113a, a metal oxide film 113b, and a cover metal layer 113c.

The metal foil 113a may include an active portion 31 and an exposing portion 32 integrally formed with an end of the active portion 31 thereon. The metal oxide film 113b and the cover metal layer 113c may be sequentially formed on both surfaces of the active portion 31. On the other hand, to enhance a degradation in an equivalent series resistance characteristic by the metal oxide film 113b when the exposing portion 32 is adhered to the second clamp 130 and thereby is connected thereto, the exposing portion 32 may be formed to be externally exposed instead of forming the metal oxide film 113b. The metal oxide film 113b may be formed on the active portion 31 of the metal foil 113a, and the cover metal layer 113c may be formed on the top of the metal oxide layer 113b to cover the active portion 31.

The metal foil 113a of the thin film capacitance member 113 may select and use one of aluminum (Al), niobium (Nb), tantalum (Ta), zirconium (Zr), and titanium (Ti). The metal oxide film 113b may select and use one of alumina ($Al_2O_3$), niobium oxide ($Nb_2O_5$), tantalum oxide ($Ta_2O_5$), zirconium oxide ($ZrO_2$), and titanium oxide ($TiO_2$). The cover metal layer 113c may select and use one of aluminum (Al), cupper (Cu), and nickel (Ni). To prevent damage due to fragility, the thin film capacitance member 113 made of the above material may be disposed on the top or bottom of the ceramic sintered member 111 to be supported by the ceramic sintered member 111.

Figure 3:
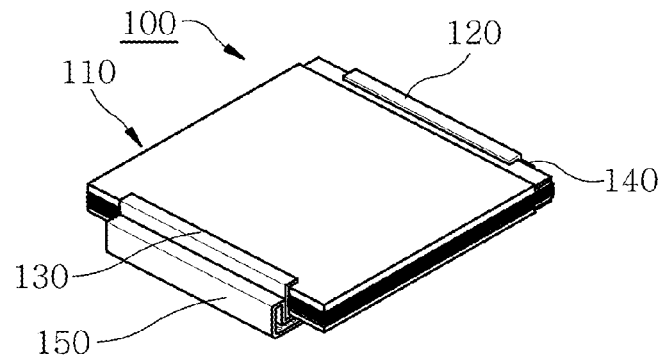
FIG. 3 is a perspective view of a state in which a molding member is removed from the package type multilayer thin film capacitor of FIG. 2.
Figure 4:
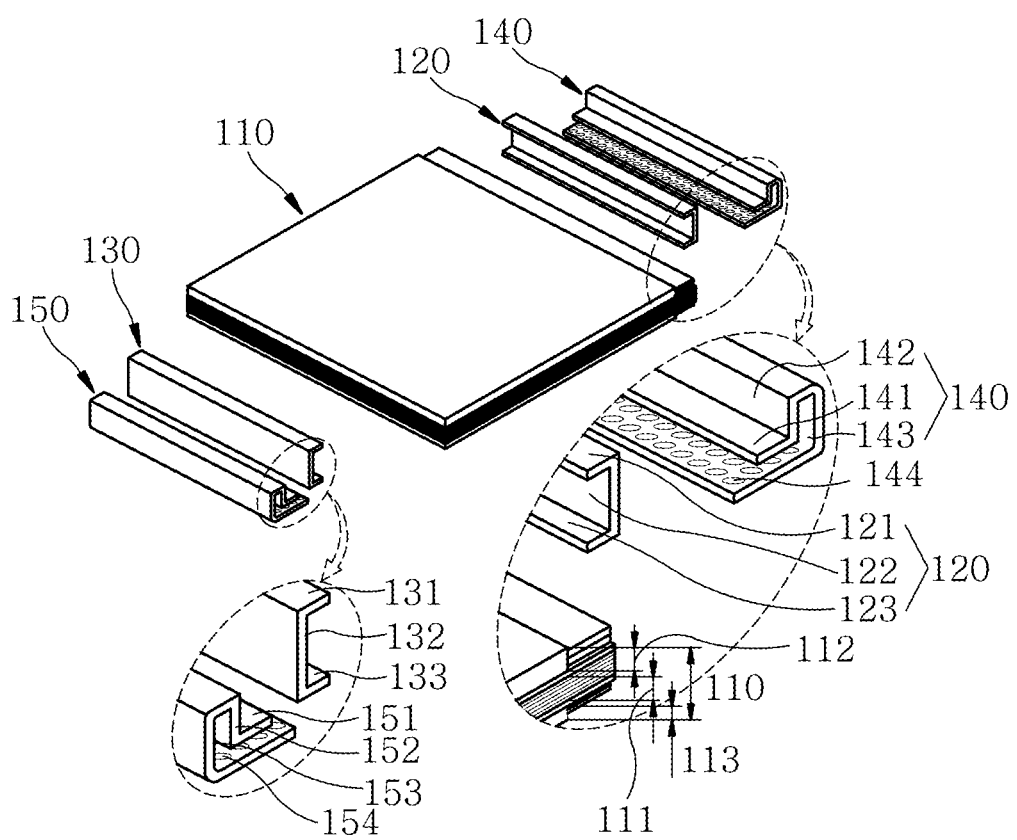
FIG. 4 is an exploded assembly perspective view of the package type multilayer thin film capacitor of FIG. 3.

As shown in FIGS. 3 through 5, the single pair of clamp members 120 and 130 may include the first clamp 120 and the second clamp 130.

The first clamp 120 may be formed to be positioned on one side of the capacitance block and to be connected to each of the plurality of first internal electrode layers 111b, the sealing metal layer 112c, and the cover metal layer 113c. The second clamp 130 may be formed on another side of the capacitance block 110 to face the first clamp 120 and to be connected to each of the plurality of second internal electrode layers 111c, the exposing portion 21 of the metal capacitance member 112, and the exposing portion 31 of the thin film capacitance member 113. Each of the single pair of clamp member 120 and 130, that is, the first clamp 120 and the second clamp 130 may be formed by selecting one of silver (Ag), palladium (Pd), nickel (Ni), cupper (Cu), and a mixture of Ag—Pd alloy, and by employing one of a screen printing method, a sputtering method, and a dipping method using a plating solution.

The first clamp 120 and the second clamp 130 may include top connection electrodes 121 and 131, vertical connection electrodes 122 and 132, and bottom connection electrodes 123 and 133, respectively.

Each of the top connection electrodes 121 and 131 may be formed to be connected to the top of the filling metal oxide layer 112c or the top of the exposing portion 22. Each of the vertical connection electrodes 122 and 132 may be formed to be connected to ends of the top connection electrodes 121 and 131, respectively, and be formed to be connected to the first internal electrode layer 111b or the second internal electrode layer 111c. The bottom connection electrodes 123 and 133 may be formed to be connected to ends of the vertical connection electrodes 122 and 132, respectively, and may be formed to be connected to the bottom of the cover metal layer 113 and the bottom of the exposing portion 32.

As shown in FIGS. 2 through 5, the single pair of lead members 140 and 150 may include the first lead member 140 and the second lead member 150.

The first lead member 140 may be formed on one side of the first capacitance block 110 to be connected to the first clamp member 120. The second lead member 150 may be formed on another side of the capacitance block 120 to face the first lead member 140 and to be connected to the second clamp member 130. The first lead member 140 and the second lead member 150 may include support lead members 141 and 151, vertical lead members 142 and 152, and buffer lead members 143 and 153, respectively.

The support lead members 141 and 151 may be formed to be connected to the top connection electrodes 123 and 133 of the clamp members 120 and 130, respectively. The vertical lead members 142 and 152 may be formed to be connected to ends of the support lead members 141 and 151, and may be formed to be connected to the vertical connection electrodes 122 and 132 of the clamp members 120 and 130, respectively. The buffer lead members 143 and 153 may be formed to be connected to ends of the vertical lead members 142 and 152 to thereby support the capacitance member 110, respectively. The buffer lead members 143 and 153 may be provided in a U shape. A plurality of holes 144 and 154 may be arranged and be formed in the bottom of the buffer lead members 143 and 153, respectively.

When mounting the first lead member 140 and the second lead member 150 on a soldering pad 6a of FIG. 1 of a printed circuit board 6 of FIG. 1 using conductive adhesives, the plurality of holes 144 and 154 enables the conductive adhesives to be uniformly distributed on the bottom of the buffer lead members 143 and 153, thereby enabling the first lead member 140 and the second lead member 150 to uniformly adhere to the soldering pad 6a and thereby be mounted thereon.

As described above, by disposing different types of capacitance members, that is, the ceramic sintered member 111, the metal capacitance member 112, and the thin film capacitance member 11 in parallel and by supporting the same using a clamp member, the package type multilayer thin film capacitor 100 of the present invention may increase capacitance, thereby achieving the high capacitance, and may enhance a mechanical strength and a heat-resistant property, thereby enhancing reliability and lifespan.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A package type multilayer thin film capacitor for a high capacitance, comprising:
   a capacitance block;
   a pair of clamp members being installed on one side and another side of the capacitance block, respectively;
   a pair of lead members being installed on the clamp members, respectively; and
   a molding member filling in the capacitance block to partially expose each of the pair of lead members,
   wherein the capacitance block is configured by adhering at least two members selected from the group consisting of a ceramic sintered member, a metal capacitance member, and a thin film capacitance member using an insulating adhesive member and thereby disposing the at least two members in a multilayered form.

2. The package type multilayer thin film capacitor of claim 1, wherein each of the ceramic sintered member, the metal capacitance member, and the thin film capacitance member is provided to be plural, and each thereof is sequentially disposed using conductive epoxy.

3. The package type multilayer thin film capacitor of claim 1, wherein the capacitance block comprises:
   the ceramic sintered member;
   at least one metal capacitance member being formed on one of a top and a bottom of the ceramic sintered member;
   at least one thin film capacitance member being formed on one of the top and the bottom of the ceramic sintered member; and
   the at least one insulating adhesive member being formed between the ceramic sintered member and the at least one metal capacitance member, and between the ceramic sintered member and the at least one thin film capacitance member.

4. The package type multilayer thin film capacitor of claim 1, wherein the ceramic sintered member comprises:
   a ceramic block;
   a plurality of first internal electrode layers being formed within the ceramic block to be connected to one of the pair of clamp members; and
   a plurality of second internal electrode layers being formed within the ceramic block to be positioned between the plurality of first internal electrode layers, and to be connected to another one of the pair of clamp members,
   wherein an end of one side of each of the plurality of first internal electrode layers is connected to one of the pair of clamp members, and an end of another side of each of the plurality of second internal electrode layers is connected to the other one of the pair of clamp members.

5. The package type multilayer thin film capacitor of claim 4, wherein each of the plurality of first internal electrode layers and the plurality of second internal electrode layers is selected from the group consisting of silver (Ag), platinum (Pt), palladium (Pd), Ag—Pd alloy, and cupper (Cu).

6. The package type multilayer thin film capacitor of claim 1, wherein the metal capacitance member comprises:
   a metal foil comprising an active portion formed to have a plurality of grooves arranged on each of both surfaces thereof and an exposing portion integrally formed with an end of the active portion thereon;
   a metal oxide film being formed on the active portion; and
   a filling metal layer being formed on a top of the metal oxide layer to cover the active portion and to fill in the plurality of grooves.

7. The package type multilayer thin film capacitor of claim 1, wherein the thin film capacitance member comprises:
   a metal foil comprising an active portion and an exposing portion formed on an end of the active portion;
   a metal oxide film being formed on the active portion of the metal foil; and
   a cover metal layer being formed on a top of the metal oxide film to cover the active portion.

8. The package type multilayer thin film capacitor of claim 7, wherein an insulating smoothness adjusting member is formed on each of the exposing portion and a top or a bottom of the exposing portion.

9. The package type multilayer thin film capacitor of claim 7, wherein the metal foil is selected from the group consisting of aluminum (Al), niobium (Nb), tantalum (Ta), zirconium (Zr), and titanium (Ti).

10. The package type multilayer thin film capacitor of claim 7, wherein the metal oxide film is selected from the group consisting of alumina ($Al_2O_3$), niobium oxide ($Nb_2O_5$), tantalum oxide ($Ta_2O_5$), zirconium oxide ($ZrO_2$), and titanium oxide ($TiO_2$).

11. The package type multilayer thin film capacitor of claim 7, wherein the cover metal layer is selected from the group consisting of aluminum (Al), cupper (Cu), and nickel (Ni).

12. The package type multilayer thin film capacitor of claim 1, wherein the pair of clamp members comprise:
   a first clamp being formed on one side of the capacitance block to be connected to each of a plurality of first internal electrode layers, a filling metal layer, and a cover metal layer; and
   a second clamp being formed on another side of the capacitance block to face the first clamp and to be connected to each of a plurality of second internal electrode layers, an exposing portion of a metal capacitance member, and an exposing portion of a thin film capacitance member.

13. The package type multilayer thin film capacitor of claim 12, wherein each of the first clamp and the second clamp comprises:

a top connection electrode being formed to be connected to a top of the filling metal layer or a top of the exposing portion;

a vertical connection electrode being formed to be connected to an end of the top connection electrode, and being formed to be connected to a first internal electrode layer or a second internal electrode layer; and a bottom connection electrode being formed to be connected to an end of the vertical connection electrode, and being formed to be connected to a bottom of a cover metal layer of the thin film capacitance member or a bottom of the exposing portion.

14. The package type multilayer thin film capacitor of claim 1, wherein each of the pair of clamp members is selected from the group consisting of silver (Ag), palladium (Pd), nickel (Ni), cupper (Cu), and a mixture of Ag—Pd alloy, and by employing one of a screen printing method, a sputtering method, and a dipping method using a plating solution.

15. The package type multilayer thin film capacitor of claim 1, wherein the pair of lead members comprise:

a first lead member being formed on one side of the capacitance block to be connected to a first clamp member; and a second lead member being formed on another side of the capacitance block to face the first lead member and to be connected to a second clamp member.

16. The package type multilayer thin film capacitor of claim 15, wherein each of the first lead member and the second lead member comprises:

a support lead member being connected to a bottom connection electrode of the clamp member;

a vertical lead member being formed to be connected to an end of the support lead member and to be connected to a vertical connection electrode of the clamp member; and a buffer lead member being formed to be connected to an end of the vertical lead member and to support the capacitance block, wherein the buffer lead member is formed in a U shape and a plurality of holes is arranged and thereby is formed in a bottom of the buffer lead member.

* * * * *